US006880838B2

(12) United States Patent
Hjorth

(10) Patent No.: US 6,880,838 B2
(45) Date of Patent: Apr. 19, 2005

(54) MATERIAL CART FOR USE ON CURVED SURFACE ROOFS

(75) Inventor: Eric Hjorth, El Campo, TX (US)

(73) Assignee: STP Nuclear Operating Co., Wadsworth, TX (US)

( * ) Notice: Subject to any disclaimer, the term of this patent is extended or adjusted under 35 U.S.C. 154(b) by 72 days.

(21) Appl. No.: 10/245,962

(22) Filed: Sep. 18, 2002

(65) Prior Publication Data

US 2004/0051267 A1 Mar. 18, 2004

(51) Int. Cl.[7] .................................................. B62B 3/18
(52) U.S. Cl. ................................. 280/79.2; 280/33.996
(58) Field of Search ........................... 280/79.2, 47.41, 280/47.34, 33.996, 33.995, 33.997, 33.991, 5.2, 5.32

(56) References Cited

U.S. PATENT DOCUMENTS

| | | | | |
|---|---|---|---|---|
| 1,142,630 A | | 6/1915 | Rydell | |
| 2,635,797 A | | 4/1953 | Siebert | |
| 2,689,132 A | * | 9/1954 | Forest | 280/33.996 |
| 2,766,049 A | * | 10/1956 | Just et al. | 280/33.996 |
| 2,776,843 A | * | 1/1957 | Just et al. | 280/33.996 |
| 2,992,833 A | | 7/1961 | Hoedinghaus et al. | |
| 3,052,484 A | * | 9/1962 | Huffman et al. | 280/654 |
| 3,669,464 A | | 6/1972 | Linzmeier | |
| 3,700,074 A | * | 10/1972 | Shoffner | 186/65 |
| 3,797,861 A | * | 3/1974 | Shoffner | 280/33.996 |
| 4,119,044 A | | 10/1978 | Hines | |
| 4,268,049 A | * | 5/1981 | Salvador | 280/33.996 |
| 4,273,346 A | * | 6/1981 | Rehrig | 280/33.995 |
| 5,152,489 A | | 10/1992 | Christensen et al. | |
| 5,312,121 A | | 5/1994 | Chapman | |
| 5,503,424 A | * | 4/1996 | Agopian | 280/651 |
| 5,755,816 A | * | 5/1998 | Schirmer et al. | 414/768 |
| 5,853,180 A | | 12/1998 | Taylor | |
| 5,857,695 A | | 1/1999 | Crowell | |
| 5,865,449 A | * | 2/1999 | Castaneda | 280/33.996 |
| 6,109,625 A | | 8/2000 | Hewitt | |
| 6,109,628 A | | 8/2000 | Scheper | |
| 6,206,385 B1 | | 3/2001 | Kern et al. | |
| 6,227,553 B1 | * | 5/2001 | Palmer | 280/47.18 |
| 6,533,297 B1 | * | 3/2003 | Saccani | 280/33.995 |
| 6,676,139 B1 | * | 1/2004 | Saccani | 280/33.991 |

FOREIGN PATENT DOCUMENTS

JP          585366 A  *  6/1993

* cited by examiner

*Primary Examiner*—Christopher P. Ellis
*Assistant Examiner*—Jeff Restifo
(74) *Attorney, Agent, or Firm*—Bracewell & Patterson, LLP

(57) ABSTRACT

A cart for transport of material, such as tools, equipment, supplies and the like on curved surface roofs of a building or other structure which as a varying or changing slope. The cart has a base frame mounted on rear wheels and forward casters. The base frame attaches by a rope or cable to an anchor point on the roof. An equipment basket is suspended at pivot points between supports extending above the base frame. The basket and its contents thus remain in a level, stable position on the roof as the cart is moved to various locations over the curved roof surface during use.

15 Claims, 3 Drawing Sheets

MATERIAL CART FOR USE ON CURVED SURFACE ROOFS

BACKGROUND OF THE INVENTION

1. Field of the Invention

The present invention relates to a cart for transport of tools, supplies, equipment, and other material over a curved surface in connection with work on that surface.

2. Description of the Related Art

There are buildings and other types of structures which have a curved roof or upper surface which changes in shape over its downward extent or slope, often as well across its lateral extent or span. An example with which applicant is familiar is the generally dome-shaped roof of a reactor containment building at an electrical power generating facility. Upper portions of this curved roof or surface are often on the order of two hundred feet or so, or even more, above the earth's surface in the nearby area.

From time to time, repairs, maintenance or inspections must be made on the surface of this type of curved roof surface. This required equipment and tools for the service crew. The service crewmembers had need for several types of equipment and tools while working on the roof, and the equipment not in use had to be safely stored. Clearly a loose object falling several hundred feet from the roof was a major safety hazard.

However, the tools and equipment had to be kept available on the roof by the service crew as needs arose to use them. Further, the service crewmembers needed their hands and arms free for work purposes. Each service crewmember for safety reasons wore a safety harness attached by a cable or rope to a connection at the top of the roof.

There were competing demands on service crews to be able to safely work easily and quickly on these elevated, irregular-shaped work surfaces and yet have tools and equipment readily at hand. One possible approach was to have additional work crewmembers assigned to provide and hold the tools and equipment. This solution increased the number of workers in a relatively risky locale and could give rise to safety concerns.

So far as is known, carts for general transport of items over flat or planar surfaces did not lend themselves to use on curved surfaces of roofs and the like. Stability of the cart on the curved surface was one concern, while ease of movement of these types of general transport carts over the curved surface was another. Carts adapted for transport or storage of special items of equipment or cargo on flat or planar surfaces suffered from the same concerns.

SUMMARY OF THE INVENTION

Briefly, the present invention provides a new and improved cart for transport of materials over a curved or non-planar roof or similar surface of a building or other structure.

The cart includes a base frame and a material basket for receiving the material to be used on the surface. The base frame is connectable to the building and has transport wheels for movement of the cart over the surface. The transport wheels include a set of casters located in the base frame for multidirectional movement of the cart over the surface. The transport wheels also include a set of roller wheels for movement of the cart over vertical portions of the surface. The material basket is movable with respect to the base frame and remains in a horizontal position as the base frame moves over the surface.

The material basket thus remains in a horizontal or level position with respect to the curved surface as the cart is moved over the surface. Material received in the basket is thus retained in the basket and the likelihood of it falling out of the basket because the base frame changes position due to the curved surface is greatly reduced.

DETAILED DESCRIPTION OF THE PREFERRED EMBODIMENTS

Figure 1:
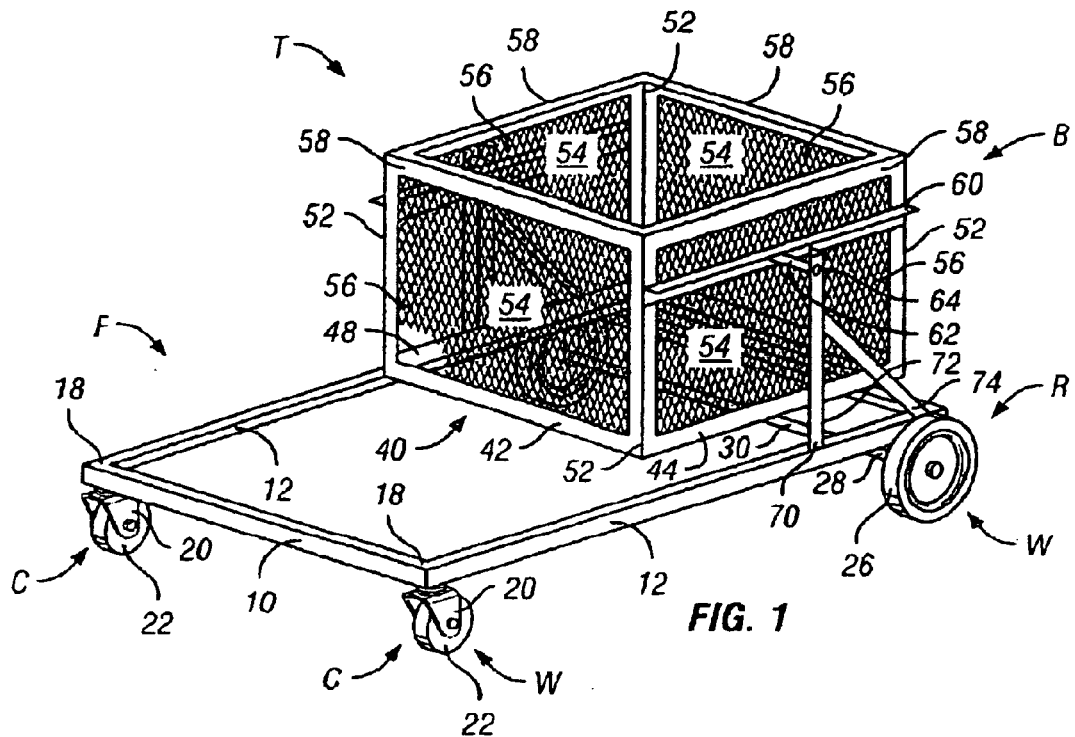
FIG. 1 is an isometric view of a material cart according to the present invention, with potions thereof removed.
Figure 2:
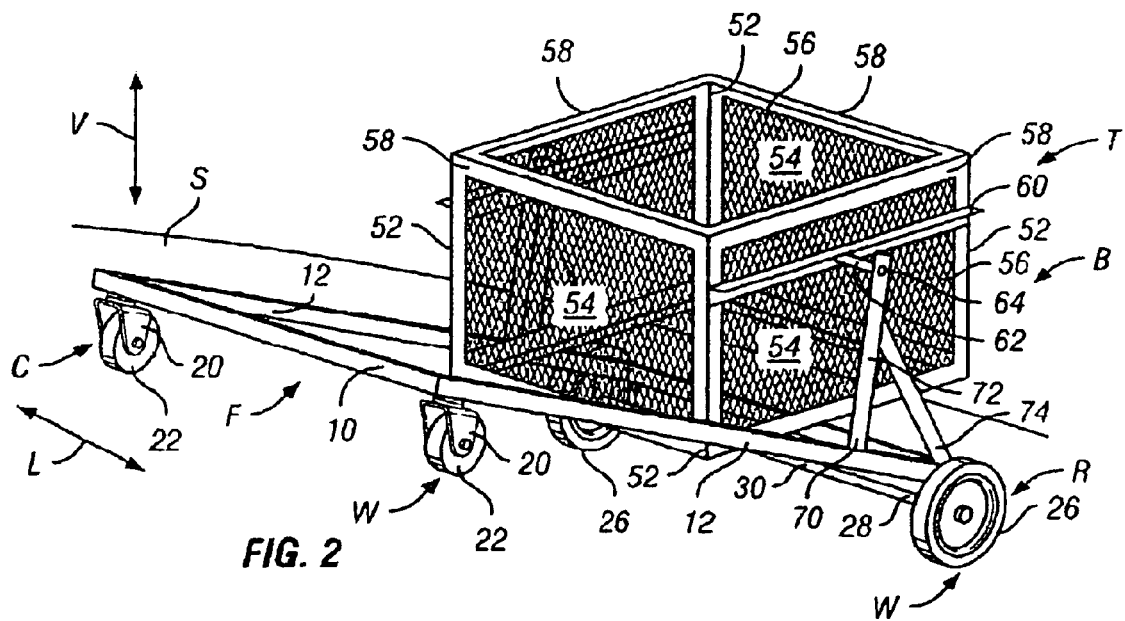
FIG. 2 is another isometric view of the material cart of FIG. 1.
Figure 3:
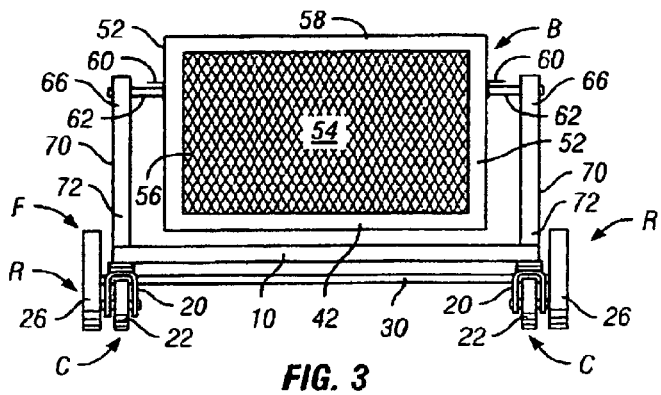
FIG. 3 is a front elevation view of the material cart of FIG. 1.
Figure 4:
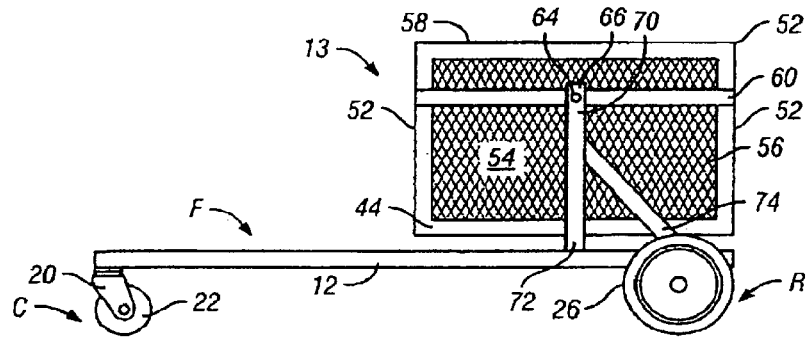
FIG. 4 is a side elevation view of the material cart of FIG. 1.

In the drawings, the letter T designates generally a transport cart for transport of material over a curved surface S (FIG. 2) of a building or other structure, such as a roof. The surface S is a curved roof or upper surface which changes its shape in a vertical plane indicated by an arrow V as well as in a lateral plane indicated by an arrow L. In one embodiment, the surface S is a generally dome-shaped roof of a reactor containment building at a nuclear-powered electric power generation facility. Such a surface as the surface S can be on the order of approximately two hundred feet above ground level.

Periodically, maintenance or service crews must install or repair items on the surface S. Examples of such items which can be installed or repaired are grounding rods and mounting tripods or bases for such rods. It should be understood that other types of items located on the surface S may also need from time to time to be installed or repaired. The transport cart T is used to provide storage and movement of materials for use by service crews at such times. The materials may be tools, supplies, equipment and other items. A wide variety of materials may be stored and moved with the transport cart T of the present invention. For example, the cart T may be used to transport and store: wrenches; nut drivers; pliers; power drills; containers of nuts, bolts, or other fasteners; lubricant containers or spray cans; couplings and bases for equipment to be installed; and other similar types of materials. Further, equipment to be installed on or removed from the surfaces may also be transported and stored in or on transport cart T. The particular types of materials depend upon the nature of the work to be performed on the surface S. The transport cart T is moved onto the surface S through a conventional axis portal or door present on the roof. Typically, one or more anchor mechanisms are provided at the access portal through which service crewmembers attach their safety harnesses by means of a retainer cable or rope.

Considering the transport cart T in more detail, the cart T includes a base frame F and a material basket B for receiving the material to be used on the surface S. The material basket B is movable with respect to the base frame F yet remains in a horizontal position with respect to the ground level as the base frame F moves over the surface S. The base frame F is connected to one of the anchor points on the building by an attachment rope or cable R shown schematically in FIG.

5. The attachment rope may be tied to the frame F at one or more, preferably two, or alternatively one or more connector hooks or rings may be provided for attachment of such a rope or cable.

The base frame F is a generally rectangular structure including a front bar or frame member 10 to which the attachment rope or cable R is connected. Two side frame members 12 extend rearwardly from the front frame member 10 to a rear frame 14. The frame members 10, 12 and 14 may be channel members, beams, cylindrical or rectangular tubes or solid rods or bars, as desired.

Transport wheels W are provided with the frame F for movement of the cart T over the surface or roof S. The movement of the cart T is multi-directional in that the cart T may move freely in the plane V and laterally in the plane L over the changing contours of the roof S as required by service crews during use. A crewmember by exerting a pulling force on the attachment cable or rope R is able to cause such movement. Typically, small obstacles such as small connector bolts and grounding grid wires are present on the roof S. The transport wheels W also are sufficiently large to allow the cart T to move smoothly over such small obstacles.

The wheels W include a set of casters C located on an upper portion of the base frame F near the front frame member 10 to afford lateral and vertical, and thus multi-directional movement of the cart T over the surface S. The casters C are preferably mounted at junctures 18 of the front frame member 10 with the side frame members 12 and are freely rotatably moveable in a plane defined by the base frame F. The caster wheels C include a yoke or housing 20 in which wheels 22 are rotatably movable in a plane perpendicular to the plane of the base frame F.

The yokes or housings 20 in which the caster wheels 22 are, as has been set forth, freely rotatably movable with respect to the base frame F so that the caster wheels 22 may guide the transport cart T both laterally and vertically in response to forces exerted by the service crew members to move the cart T by use of the attachment cable or rope or otherwise.

Figure 6:
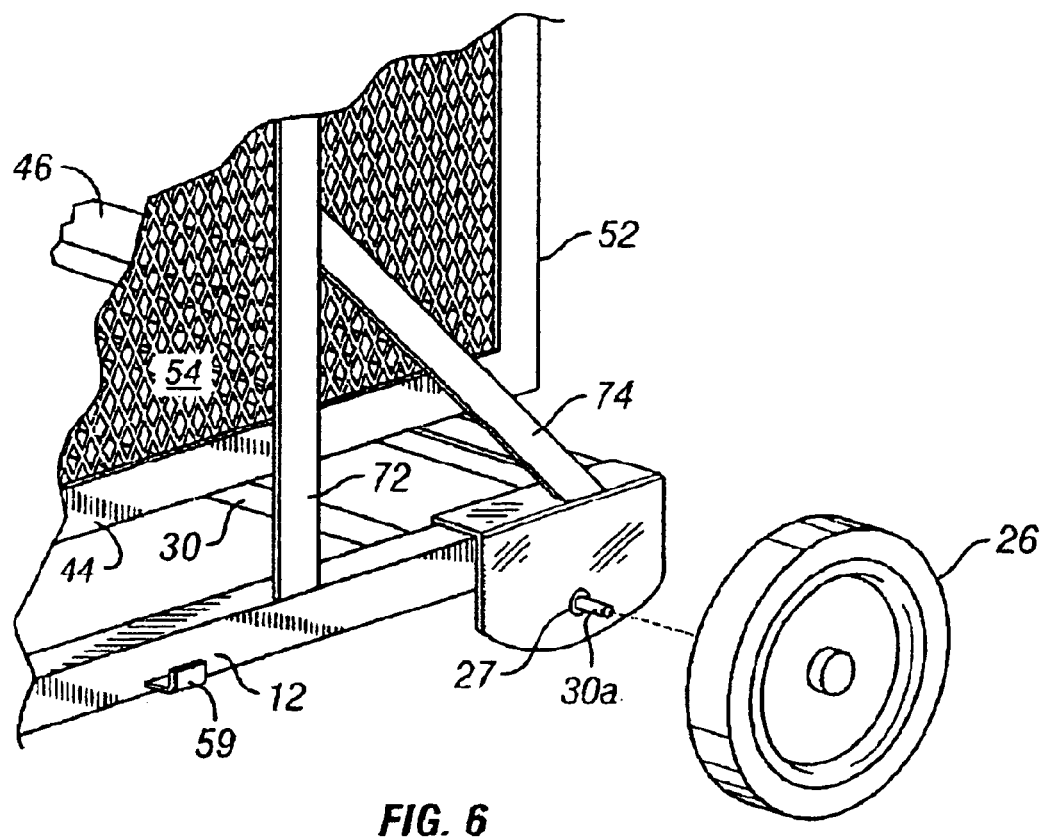
FIG. 6 is a partially exploded isometric view of a portion of the material cart of FIG. 1.

The support wheels W also include a pair or rear wheels R located near the rear frame member 14. The rear wheels R take the form of roller wheels 26 rotatable in the vertical plane V for movement of the cart vertically in the vertical plane V up and down the surface S. The roller wheels 26 may be larger than the caster wheels 22, as shown, or they may be of like size, if desired. The roller wheels 26 are suitably mounted to side frame members 12 at or near the rear frame member 14 for rotational movement. The roller wheels 26 are mounted on an axle 30 or shaft pin to rotate about an axis generally parallel with the rear frame member 14. The axis of rotation of the rear roller wheels 26 may be along a common laterally extending axle 30 parallel with the frame member 14 as shown. Each of the roller wheels 26 is fitted for rotational movement to an outer end 30a at each end of the axle 30 which extends through a bearing or sleeve 27 (FIG. 6) in a yoke or lug 28 mounted on side frame member 12. It should be understood that each roller wheel 26 may be individually provided with a separate shaft pin for rotational support instead of being provided with a common axle 30.

It should also be understood that in some cases, the rear or lower set R of wheels may be caster wheels in place of roller wheels for greater freedom of movement, if desired.

The material basket B is movably mounted to the base frame F to remain in a horizontal position with respect to ground level as the base frame F moves over the surface S despite variations in the curvature and shape of the surface S. The material basket B has a lower frame 40 composed of four side members 42, 44, 46 and 48 defining a rectangular frame. The side members 42, 44, 46 and 48 may be angle members, channels, beams or rods, as desired. A mesh or screen or expended bar sheet or other suitable material is mounted extending between the four side members 42, 44, 46 and 48 to form a bottom surface 50 of the material basket B. If desired, the bottom surface 50 may be a continuous sheet of metal, wood or other suitable material.

Figure 5:
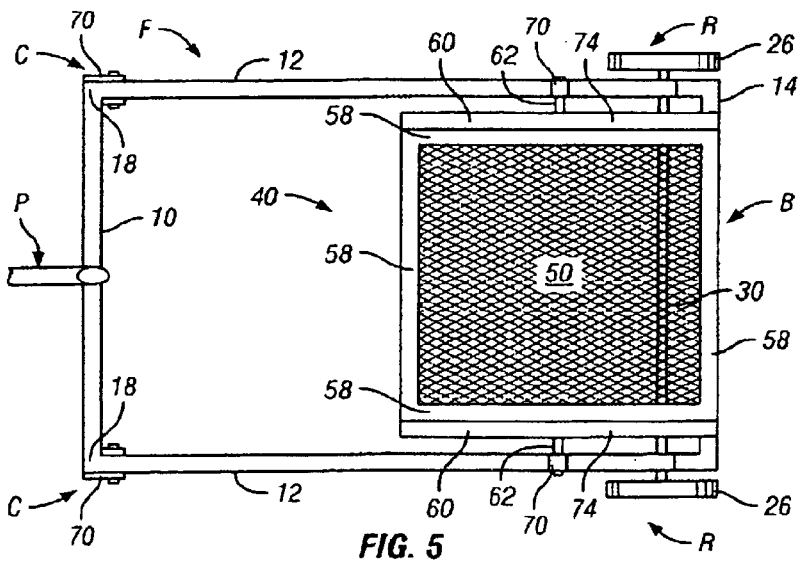
FIG. 5 is a top view of the material cart of FIG. 1.

Four uprights or posts 52 are formed at each corner of the bottom frame of the material basket B extending upwardly. A sheet of mesh, screen or other suitable material 54 is mounted to extend between each pair of uprights 52 to form side walls 56 of the material basket B. Again, the side walls 56 may be of a continuous panel or sheet of material if desired. Top edge members 58 are mounted to extend between each adjacent set of uprights 52 above the side walls 56 to define upper edges of the material basket B. The uprights 50 and the edge members 58 may be formed of the structural materials like those suitable for use on side members of the lower frame 50. If desired attachment clips, hooks or other suitable attachment or connector members 59 may be mounted, as shown in FIG. 5, on the base frame F or the material basket B to provide connector locations for materials or items which do not readily fit into the basket B.

Connector bars or beams 60 are mounted with the side walls 56 extending from the front to the rear of the material basket B and have outwardly extending rods or shafts 62 mounted at the center portions thereof along the length of their extent. The rods or shafts 62 are each freely rotatably movable in connector openings 64 formed in the upper end 66 of a support member 70 on each side of the base frame F. Each of the support members 70 is a vertically upstanding member, end one of which is mounted at a lower end 72 on one of the side members 12, typically approximately one quarter of the length of the side frame member 12 from the rear frame 14 to the front frame 10. Support struts 74 are mounted extending upwardly from the side members 12 near the rear frame 14 for connection at a suitable height on the uprights 70 for support of the uprights 70 and for load bearing purposes.

In the operation of the present invention, the service crew loads materials into the basket B and the cart T. The cart is then attached to the building and placed on the surface S. The cart T may be lowered vertically over the surface S because of the rear wheels R.

The cart T is also capable of multidimensional movement, both laterally and vertically, due to the caster wheels C. As the cart T moves over the curved surface S, the material basket B remains in a level or horizontal position because of its pivoted connection to the support members 70 of the base frame F.

In this way, the risk of materials falling from or slipping out of the basket B is materially reduced. Further, the center of gravity of the cart T remains below the rods 62. Thus the likelihood of the cart T falling or tilting because of imbalance is also reduced.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A cart for transport of material over a three-dimensionally curved surface of a structure, comprising:

a base frame connectable at a front frame member to an anchor point of the building and having transport wheels for movement of the cart over the surface;

the transport wheels including a set of casters located on the base frame for three-dimensional multidirectional movement of the cart over the curved surface and a set of roller wheels for movement of the cart over vertically inclined portions of the three dimensionally curved surface;

a material basket for receiving the material and being movable with respect to the base frame, the material basket having a lower frame and an upper frame;

support members extending upwardly from the base frame to support the material basket above the base frame; and pivot mechanisms between the material basket and the support members to allow rotational movement of the material basket between and with respect to the support members such that the lower frame of the material basket is positionable below the front frame member of the base frame, thus allowing the basket to remain in a horizontal position as the base frame moves over the vertically inclined portions of the three dimensionally curved surface.

2. The cart of claim 1, wherein the support members include an upright located between the base frame and the material basket.

3. The cart of claim 2, further including a support bar extending between the base frame and the upright.

4. The cart of claim 1, wherein the base frame has an upper end for connection to a support line mounted with the building and a lower end opposite the upper end and wherein the support members are located on the base frame closer to the lower end than the upper end.

5. The cart of claim 1, wherein the base member has an upper end for connection to a support line mounted with the building and a lower end opposite the upper end and wherein the casters of the transport wheels are located below the upper end of the base frame.

6. The cart of claim 1, wherein the base member has an upper end for connection to a support line mounted with the building and a lower end opposite the upper end and wherein the casters of the transport wheels comprise casters located below the upper end of the base frame for allowing movement of the cart over the three-dimensionally curved surface of the building.

7. The cart of claim 1, wherein the base member has an upper end for connection to a support line mounted with the building and a lower end opposite the upper end and wherein the roller wheels of the transport wheels comprise wheels mounted with the base frame rotatable in a vertical plane to move the cart upwardly and downwardly over the vertically inclined portions of the three-dimensionally curved surface of the building.

8. The cart of claim 1, further including attachment members on the cart for connecting items of material to the cart.

9. A cart for providing work materials to service personnel on a three-dimensionally curved surface of a building, comprising:

a base frame connectable at a front flame member to an anchor point of the building and having transport wheels for movement of the cart over the surface;

the transport wheels including a set of casters located on the base frame for three-dimensional multidirectional movement of the cart over the curved surface and a set of roller wheels for movement of the cart over vertically inclined portions of the three dimensionally curved surface;

a material basket for receiving the material and being movable with respect to the base frame, the material basket having a lower frame and an upper frame;

support members extending upwardly from the base frame to support the material basket above the base frame; and pivot mechanisms between the material basket and the support members to allow rotational movement of the material basket between and with respect to the support members such that the lower frame of the material basket is positionable below the front frame member of the base frame, thus allowing the basket to remain in a horizontal position as the base frame moves over the vertically inclined portions of the three dimensionally curved surface.

10. The cart of claim 9, wherein the base member has an upper end for connection to a support line mounted with the building and a lower end opposite the upper end and wherein the support members are located on the base frame closer to the lower end than the upper end.

11. The cart of claim 9, wherein the base member has an upper end for connection to a support line mounted with the building and a lower end opposite the upper end and wherein the casters of the transport wheels comprise casters located below the upper end of the base frame.

12. The cart of claim 9, wherein the base member has an upper end for connection to a support line mounted with the building and a lower end opposite the upper end and wherein the casters of the transport wheels comprise casters located below the upper end of the base frame for allowing movement of the cart over the three-dimensionally curved surface of the building.

13. The cart of claim 9, wherein the base member has an upper end for connection to a support line mounted with the building and a lower end opposite the upper end and wherein the roller wheels of the transport wheels comprise wheels mounted with the base frame rotatable in a vertical plane to move the cart upwardly and downwardly over the vertically inclined portions of the three-dimensionally curved surface of the building.

14. The cart of claim 9, wherein the support members include an upright located between the base and the material basket.

15. The cart of claim 14, further including a support bar extending between the base frame and the upright.

* * * * *